United States Patent
Lin (10) Patent No.: US 11,094,049 B2
(45) Date of Patent: Aug. 17, 2021

(54) COMPUTING DEVICE AND NON-TRANSITORY STORAGE MEDIUM IMPLEMENTING TARGET OBJECT IDENTIFICATION METHOD

(71) Applicant: TRIPLE WIN TECHNOLOGY(SHENZHEN) CO.LTD., Shenzhen (CN)

(72) Inventor: Kuo-Hung Lin, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 103 days.

(21) Appl. No.: 16/734,434

(22) Filed: Jan. 6, 2020

(65) Prior Publication Data

US 2021/0065350 A1 Mar. 4, 2021

(30) Foreign Application Priority Data

Sep. 4, 2019 (CN) .......................... 201910833464.3

(51) Int. Cl.
| | |
|---|---|
| G06T 7/00 | (2017.01) |
| G06T 7/90 | (2017.01) |
| G06F 9/54 | (2006.01) |
| G06T 7/60 | (2017.01) |

(52) U.S. Cl.
CPC ............ *G06T 7/0002* (2013.01); *G06F 9/542* (2013.01); *G06T 7/60* (2013.01); *G06T 7/90* (2017.01); *G06T 2207/10024* (2013.01)

(58) Field of Classification Search
CPC .......... G06T 7/0002; G06T 7/90; G06T 7/60; G06T 2207/10024; G06T 2207/30201; G06T 7/62; G06T 7/11; G06T 7/73; G06F 9/542

USPC ......................................................... 382/107
See application file for complete search history.

(56) References Cited

U.S. PATENT DOCUMENTS

| | | | | |
|---|---|---|---|---|
| 9,881,367 | B1* | 1/2018 | Milne | G06T 7/11 |
| 2005/0240104 | A1* | 10/2005 | Shim | A61B 8/00 |
| | | | | 600/437 |
| 2008/0029602 | A1* | 2/2008 | Burian | G06K 7/10722 |
| | | | | 235/462.09 |
| 2013/0016198 | A1* | 1/2013 | Higuchi | G02B 23/2484 |
| | | | | 348/65 |
| 2014/0067631 | A1* | 3/2014 | Dhuse | G06Q 40/12 |
| | | | | 705/30 |

(Continued)

FOREIGN PATENT DOCUMENTS

TW 514515 B 12/2002

*Primary Examiner* — Ali Bayat
(74) *Attorney, Agent, or Firm* — ScienBiziP, P.C.

(57) ABSTRACT

A target object identification method includes acquiring an image to be identified, identifying at least one target area in the image and marking the target area to obtain at least one marked area, performing binarization processing on the marked area, identifying the boundary pixels and effective pixels of the target area in the marked area, and determining a center and a size of the target area according to a position of the boundary pixels and the effective pixels. An area of the marked area is greater than or equal to an area of the target area. The target area is located within the marked area. A color of pixels of the target area after the binarization process is different from a color of pixels outside the target area.

15 Claims, 6 Drawing Sheets

(56) References Cited

U.S. PATENT DOCUMENTS

2015/0261998 A1* 9/2015 Yamanashi ............. G06T 5/003
                                                          382/103
2019/0065859 A1* 2/2019 Togashi ................. G06T 7/215

* cited by examiner

COMPUTING DEVICE AND NON-TRANSITORY STORAGE MEDIUM IMPLEMENTING TARGET OBJECT IDENTIFICATION METHOD

FIELD

The subject matter herein generally relates to the image recognition technology, and more particularly to a target object identification method implemented in a computing device.

BACKGROUND

In image recognition technology, a camera device can automatically recognize and accurately locate the position of a face in a picture. In order to obtain a better recognition effect, the camera device needs to be calibrated before leaving the factory. In the existing production process, an object to be recognized by the camera device is generally positioned by manual calibration, which has low accuracy and is slow.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
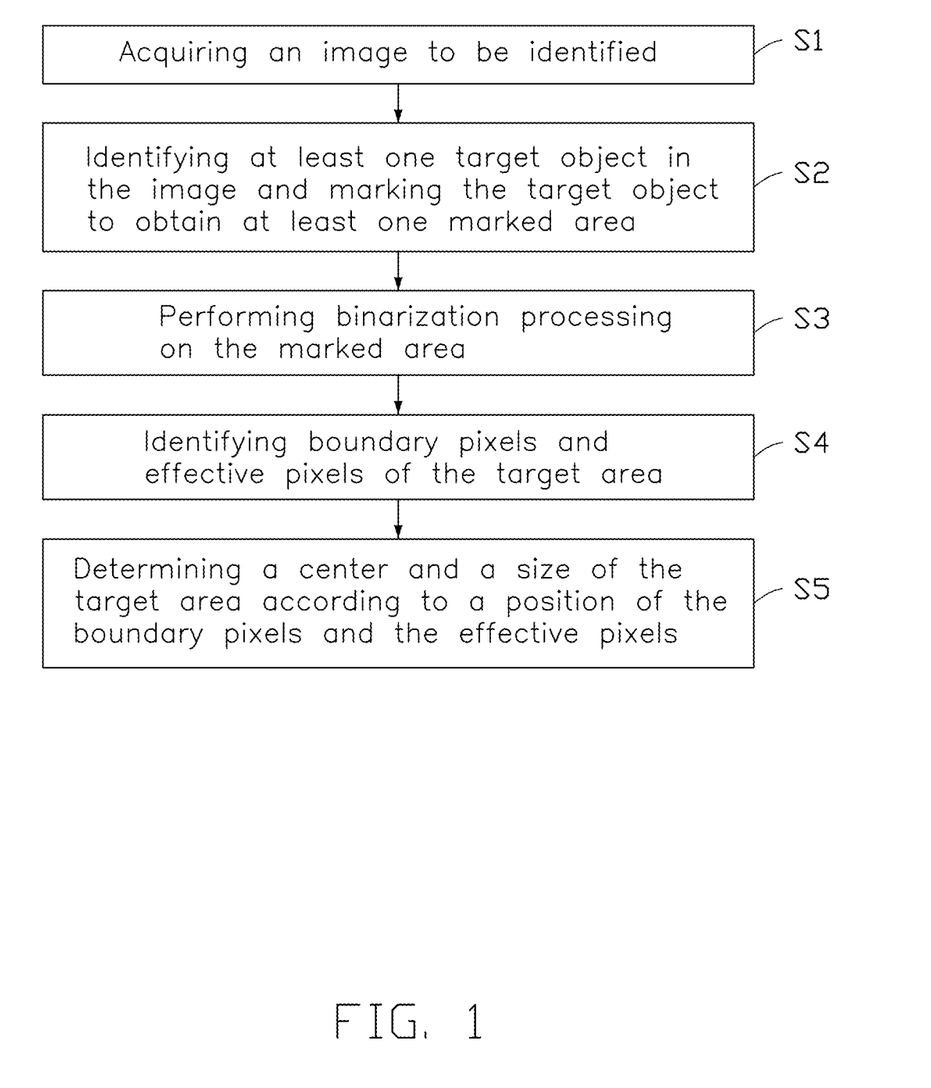
FIG. 1 is a flowchart of a method for identifying target object in an image.

FIG. 1 shows a flowchart of a method for locating a target object in an image. The order of the blocks in the flowchart may be changed according to different requirements, and some blocks may be omitted.

In block S1, an image to be identified is acquired.

In one embodiment, the image to be identified is acquired from a photosensitive element by a processor of an image capturing device. In other embodiments, the image to be identified may also be obtained from other storage media.

In block S2, at least one target area in the image is identified, and the target area is marked to obtain at least one marked area, wherein an area of the marked area is greater than or equal to an area of the target area, and the target area is located within the marked area.

In one embodiment, the step of identifying at least one target area in the image to be identified may include:

Obtaining the feature information of the target area from a database;

Locating the feature information in the image to be identified;

If the feature information is located in the image, marking an area having the feature information;

If the feature information is not located in the image, issuing a prompt message.

Figure 2:
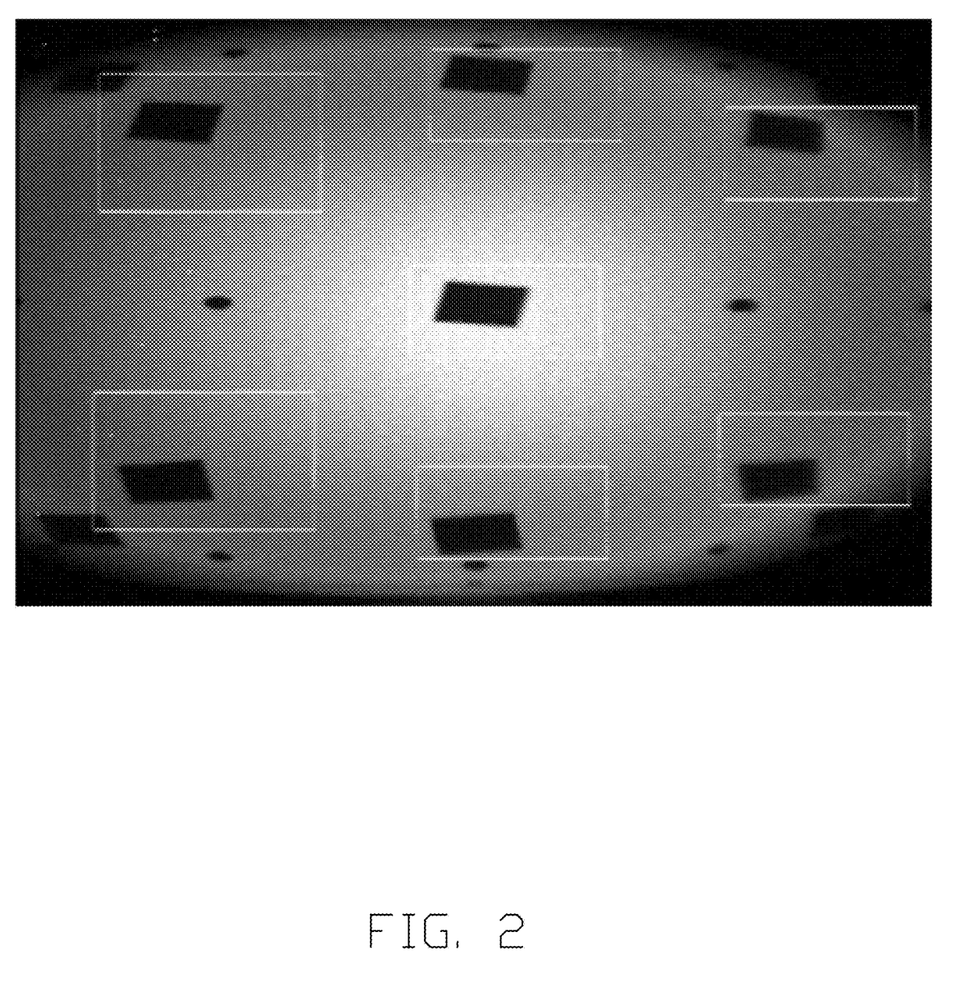
FIG. 2 is a diagram showing identification of a marked area and a target object in the marked area of an image.

For example, referring to FIG. 2, the processor of the image capturing device obtains the image to be identified and acquires feature information of the target area to be identified from a database. The database stores historical feature information of the target area to be identified, and the processor is configured to search for a target area having the feature information in the image to be identified, in which the processor performs a matching search with the feature information in the database, and marks the marked area including the target area, as shown by the seven rectangles in FIG. 2. In FIG. 2, seven marked areas are marked, each of which contains a complete target area, and the area of the marked area is larger than the area of the target area. Some adjacent target areas are closely spaced, and in some of the marked areas, not only a complete target area but also some other target areas adjacent to the complete target area are included. In other embodiments, the area of the marked area may also be equal to the area of the target area, and the target area is included in the marked area. A shape of the marked area may also be other shapes such as a circle, a square, or the like.

If the processor does not find the area with the feature information in the image to be identified, a message that the target area is not found is sent in the form of a prompt.

In block S3, the binarization processing is performed on the marked area, wherein a color of pixels of the target area after the binarization process is different from a color of pixels outside the target area.

Figure 3:
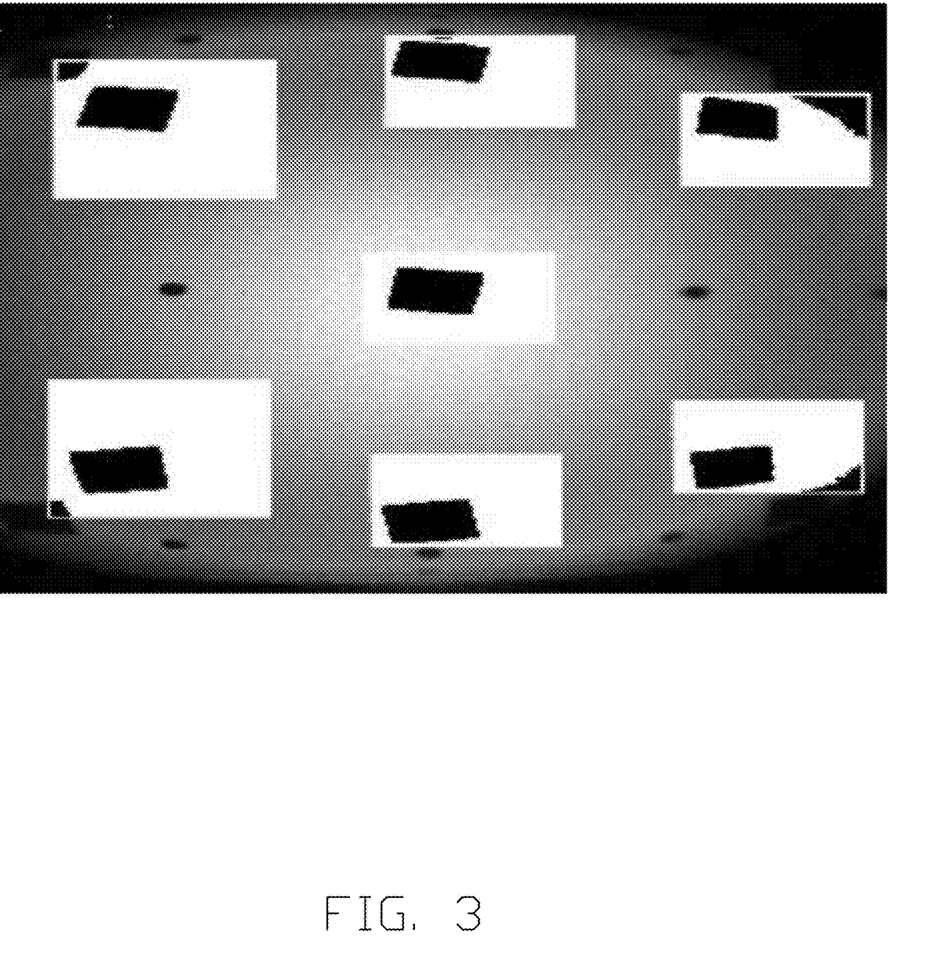
FIG. 3 is a diagram showing binarization processing on the marked area and the target object.

In one embodiment, as shown in FIG. 3, the binarization processing may include the following steps. A color value of pixels in the target area is assigned as 255, and a color value outside the identified target area is assigned as 0. After the binarization process, as shown in FIG. 3, among the seven marked areas in the image to be identified, the color of the pixels of the target area is black, and the color of the pixels outside the target area is white. Four of the marked areas contain a complete target area, and three of the marked areas contain portions of adjacent target areas which are also assigned the color value 255.

In block S4, the boundary pixels of the target area and the effective pixels of the target area in the marked area are identified.

In one embodiment, the step of identifying boundary pixels of the target area in the marked area may include the following:

A color of each pixel in the target area in the marked area is identified, and a color of eight pixel adjacent to each pixel in the target area is determined.

If the eight pixels around the pixel of the target area simultaneously include pixels of the same color and pixels of a different color as the pixel of the target area, the pixel of the target area is a boundary pixel.

Figure 4:
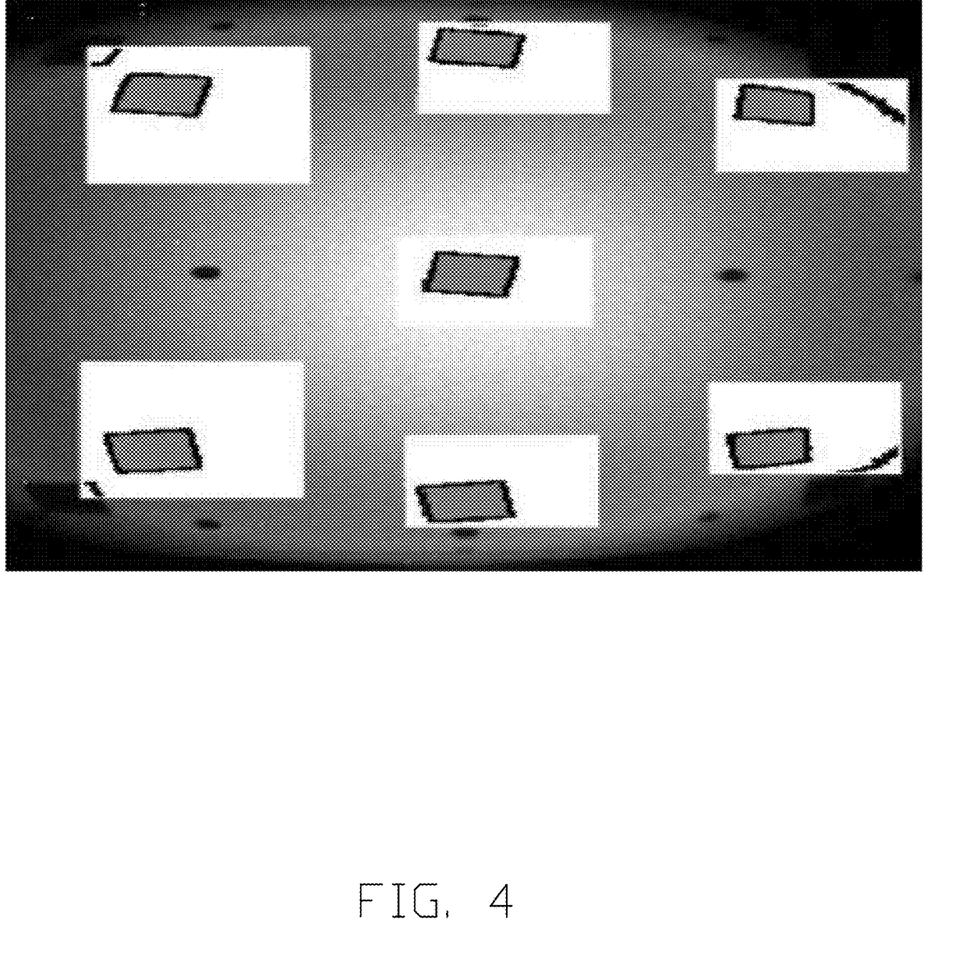
FIG. 4 is a diagram showing boundary identification of the target objects in the marked areas.

For example, referring to FIG. 4, the pixels of the target area having the color value assigned to the target area in block S3 are searched. The pixels of the target area are black, that is, the pixels of the target area in the marked area have the color value 255. For any pixel with a color value of 255, the color value of the eight pixels surrounding the pixel is determined. If the eight pixels surrounding the pixel having a color value of 255 simultaneously include pixels having a color value of 255 and a color value of 0, the pixel is a boundary pixel, and a position of the boundary pixel is marked.

The step of identifying effective pixels of the target area in the marked area may include the following.

Pixels to be calibrated other than the boundary pixel in the marked area are searched.

Whether there is a boundary pixel in a horizontal and vertical direction of the pixel to be calibrated is determined.

If each of the horizontal and the vertical directions of the pixel to be calibrated have at least one of the boundary pixels, the pixel to be calibrated is an effective pixel.

For example, referring to FIG. 4, pixels to be calibrated other than the boundary pixels in the image are identified to be marked. The pixels to be calibrated may be black pixels or white pixels. For any pixel to be calibrated, the pixel is centered, and whether there are boundary pixels in the horizontal and vertical directions is determined. If there are boundary pixels in the horizontal and vertical directions centered on the pixel to be calibrated, the pixel to be calibrated is an effective pixel.

In block S5, a center and a size of the target area is determined according to the position of the boundary pixel and the effective pixels.

The steps of determining the center and size of the target area may include the following.

A shape of the target area is determined according to the position of the boundary pixels and the effective pixels in the marked area;

A size and center of the target area are calculated according to the shape of the target area.

Figure 5:
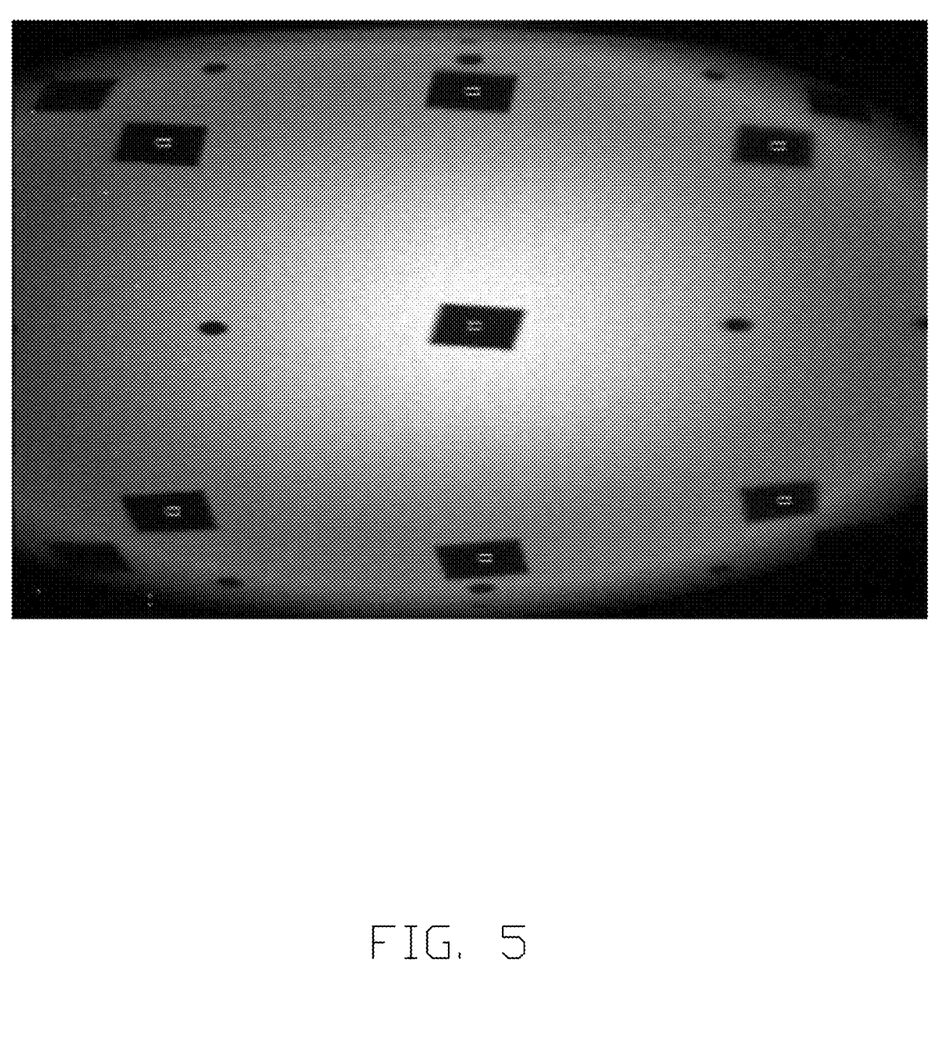
FIG. 5 is a diagram showing identification of a center of the target objects in the marked areas.

For example, using the position of the boundary pixels and the effective pixels confirmed in block S4, the boundary pixels are connected by line segments, and the shape of the target area is quadrilateral. The center of the target area is obtained according to the area calculation of the quadrilateral, as shown in FIG. 5.

Figure 6:
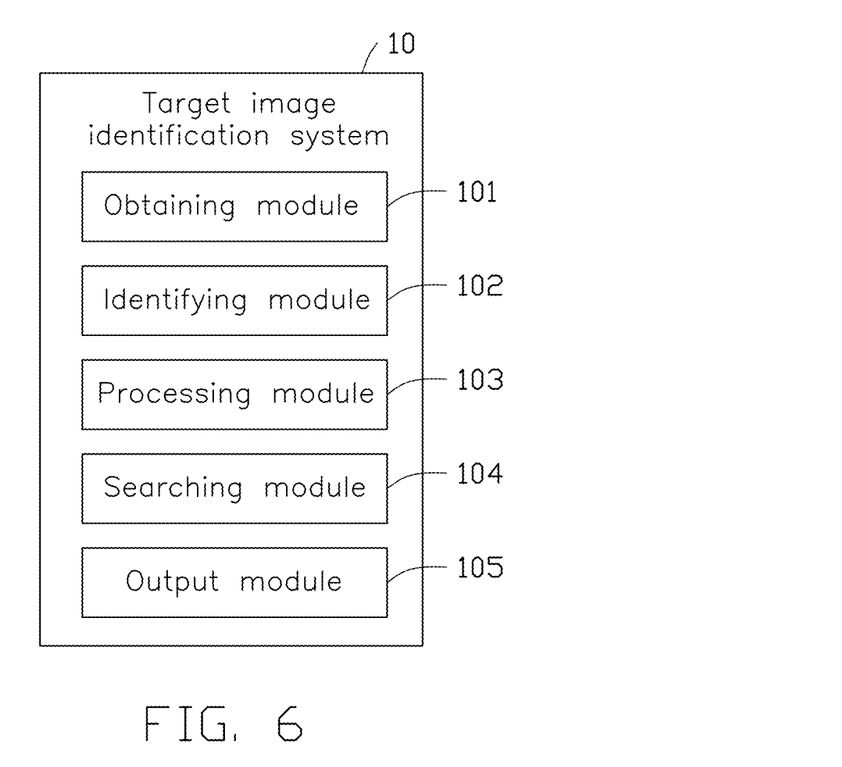
FIG. 6 is a block diagram of function modules of a target object identification system.

FIG. 6 shows a block diagram of function modules of a target object identification system 10. The target object identification system 10 may operate in a computing device. In one embodiment, the function modules may include an obtaining module 101, an identifying module 102, a processing module 103, a searching module 104, and an output module 105. A module as referred to in the present invention refers to a series of computer program segments that can be executed by at least one processor and that are capable of performing fixed functions, which are stored in a memory. The functions of the respective modules will be described in detail in the subsequent embodiments.

The obtaining module 101 is configured to acquire an image to be identified.

In one embodiment, image information of the image to be identified is acquired from a photosensitive element by a processor of an image capturing device. In other embodiments, the image to be identified may also be obtained from other storage media.

The identification module 102 is configured to identify at least one target area in the image and mark the target area to obtain at least one marked area, wherein an area of the marked area is greater than or equal to an area of the target area, and the target area is located within the marked area.

The step of identifying at least one target area in the image is described in the previous embodiment in block S2.

The processing module 103 is configured to perform binarization processing on the marked area, wherein a color of pixels of the target area after the binarization process is different from a color of pixels outside the target area.

The step of performing binarization processing on the marked area is described in the previous embodiment in block S3.

The searching module 104 is configured to identify boundary pixels and effective pixels of the target area in the marked area.

The step of identifying boundary pixels and effective pixels of the target area in the marked area is described in the previous embodiment in block S4.

The output module 105 is configured to determine and output a center and a size of the target area according to the position of the boundary pixel and the effective pixels.

The steps of determining and outputting the center and size of the target area are described in the previous embodiment in block S5.

Figure 7:
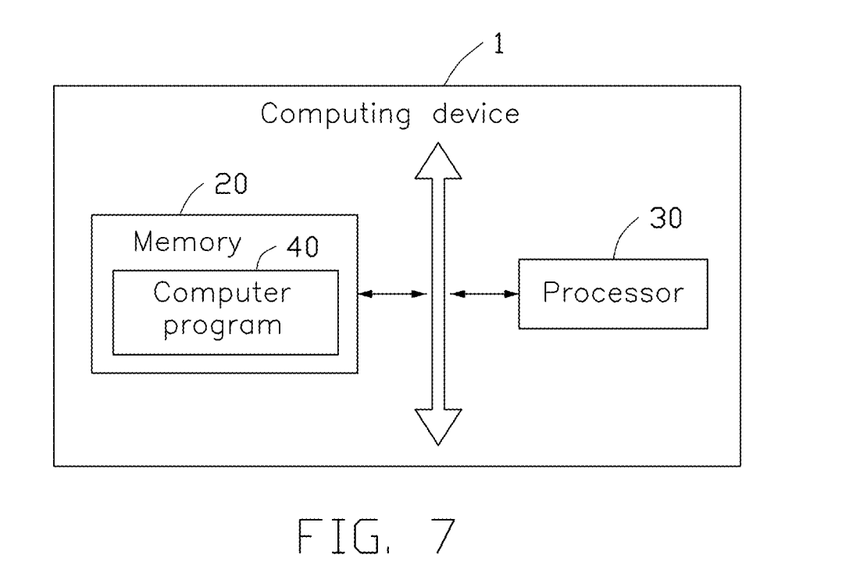
FIG. 7 is a block diagram of a computing device.

FIG. 7 is a schematic diagram of an embodiment of a computing device. The target object identification method and the target object identification system in the previous embodiments may be applied and implemented in the computing device 1. The computing device 1 may be an electronic device, such as a personal computer, a server, or the like.

The computing device 1 includes a memory 20, a processor 30, and a computer program 40. The computer program 40 is stored in the memory 20 and executed by the processor 30. When the processor 30 executes the computer program 40, the blocks in the target object identification method in FIG. 1 may be implemented. Alternatively, when the processor 30 executes the computer program 40, the functions of the modules of the target object identification system 10 in FIG. 6 may be implemented.

Illustratively, the computer program 40 can be partitioned into one or more modules/units that are stored in the memory 20 and executed by the processor 30. The one or more modules/units may be a series of computer program instruction segments capable of performing a particular function for describing the execution of the computer program 40 in the computing device 1.

The computing device 1 may be a desktop computer, a notebook, a palmtop computer, or a cloud server, for example. It will be understood by those skilled in the art that the schematic diagram is merely an example of the computing device 1, and does not constitute a limitation of the computing device 1, and may include more or less components than those illustrated, or some components may be combined, or may be different. For example, the computing device 1 may also include input and output devices, network access devices, buses, and the like.

The processor 30 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The general purpose processor may be a microprocessor, or the processor 30 may be any conventional processor or the like, and the processor 30 is a control center of the computing device 1 and connects the entire computing device 1 by using various interfaces and lines.

The memory 20 can be used to store the computer program 40 and/or modules/units by running or executing computer programs and/or modules/units stored in the memory 20 to implement various functions of the computing device 1. The memory 20 may include a storage program area and a storage data area, wherein the storage program area may store an operating system, an application required for at least one function (such as a sound playing function, an image playing function, etc.), and the like; the storage data area may store data (such as audio data, phone book, etc.) created according to the use of the computing device 1. In addition, the memory 20 may include a high-speed random access memory, and may also include a non-volatile memory such as a hard disk, a memory, a plug-in hard disk, a smart memory card (SMC), a secure digital (SD) card, a flash card, at least one disk storage device, flash device, or other volatile solid state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A target object identification method comprising:
    acquiring an image to be identified;
    identifying at least one target area in the image and marking the at least one target area to obtain at least one marked area, wherein an area of the marked area is greater than or equal to an area of the target area, and the target area is located within the marked area;
    performing binarization processing on the marked area, wherein a color of pixels of the target area after the binarization process is different from a color of pixels outside the target area;
    identifying boundary pixels and effective pixels of the target area in the marked area; and
    determining a center and a size of the target area according to positions of the boundary pixels and positions of the effective pixels.

2. The target object identification method of claim 1, wherein the at least one target area in the image is identified by:
    obtaining feature information of the target area;
    locating the feature information in the image to be identified;
    marking an area comprising the feature information if the feature information is located; and
    issuing a prompt message if the feature information cannot be located.

3. The target object identification method of claim 1, wherein the boundary pixels of the target area in the marked area are identified by:
    identifying a color of each pixel in the target area in the marked area;
    determining colors of eight pixels surrounding each pixel in the target area; and
    determining that the pixel in the target area is a boundary pixel if the eight pixels surrounding the pixel simultaneously comprise pixels of the same color and pixels of a different color as the pixel of the target area.

4. The target object identification method of claim 3, wherein the effective pixels of the target area in the marked area are identified by:
    determining the pixels other than the boundary pixels in the marked area to be pixels to be calibrated;
    determining whether there is a boundary pixel in a horizontal direction and a vertical direction of the pixel to be calibrated; and
    determining that the pixel to be calibrated is an effective pixel if each of the horizontal and the vertical directions of the pixel to be calibrated comprises at least one of the boundary pixels.

5. The target object identification method of claim 1, wherein the center and the size of the target area are determined according to the positions of the boundary pixels and the positions of the effective pixels by:
    determining a shape of the target area according to the positions of the boundary pixels and the positions of the effective pixels in the marked area; and
    calculating the size and the center of the target area according to the shape of the target area.

6. A computing device comprising:
    a processor; and
    a memory storing a plurality of instructions, which when executed by the processor, causes the processor to:
        acquire an image to be identified;
        identify at least one target area in the image and marking the at least one target area to obtain at least one marked area, wherein an area of the marked area is greater than or equal to an area of the target area, and the target area is located within the marked area;
        perform binarization processing on the marked area, wherein a color of pixels of the target area after the binarization process is different from a color of pixels outside the target area;
        identify boundary pixels and effective pixels of the target area in the marked area; and
        determine a center and a size of the target area according to positions of the boundary pixels and positions of the effective pixels.

7. The computing device of claim 6, wherein the at least one target area in the image is identified by:
obtaining feature information of the target area;
locating the feature information in the image to be identified;
marking an area comprising the feature information if the feature information is located; and
issuing a prompt message if the feature information cannot be located.

8. The computing device of claim 6, wherein the boundary pixels of the target area in the marked area are identified by:
identifying a color of each pixel in the target area in the marked area;
determining colors of eight pixels surrounding each pixel in the target area; and
determining that the pixel in the target area is a boundary pixel if the eight pixels surrounding the pixel simultaneously comprise pixels of the same color and pixels of a different color as the pixel of the target area.

9. The computing device of claim 8, wherein the effective pixels of the target area in the marked area are identified by:
determining the pixels other than the boundary pixels in the marked area to be pixels to be calibrated;
determining whether there is a boundary pixel in a horizontal direction and a vertical direction of the pixel to be calibrated; and
determining that the pixel to be calibrated is an effective pixel if each of the horizontal and the vertical directions of the pixel to be calibrated comprises at least one of the boundary pixels.

10. The computing device of claim 6, wherein the center and size of the target area are determined according to the position of the boundary pixels and the effective pixels by:
determining a shape of the target area according to the positions of the boundary pixels and the positions of the effective pixels in the marked area; and
calculating the size and the center of the target area according to the shape of the target area.

11. A non-transitory storage medium having stored thereon instructions that, when executed by at least one processor of a computing device, causes the at least one processor to execute instructions of a method for identifying a target object in an image, the method comprising:
acquiring an image to be identified;
identifying at least one target area in the image and marking the at least one target area to obtain at least one marked area, wherein an area of the marked area is greater than or equal to an area of the target area, and the target area is located within the marked area;
performing binarization processing on the marked area, wherein a color of pixels of the target area after the binarization process is different from a color of pixels outside the target area;
identifying boundary pixels and effective pixels of the target area in the marked area; and
determining a center and a size of the target area according to positions of the boundary pixels and positions of the effective pixels.

12. The non-transitory storage medium of claim 11, wherein the at least one target area in the image is identified by:
obtaining feature information of the target area;
locating the feature information in the image to be identified;
marking an area comprising the feature information if the feature information is located; and
issuing a prompt message if the feature information cannot be located.

13. The non-transitory storage medium of claim 11, wherein the boundary pixels of the target area in the marked area are identified by:
identifying a color of each pixel in the target area in the marked area;
determining colors of eight pixels surrounding each pixel in the target area; and
determining that the pixel in the target area is a boundary pixel if the eight pixels surrounding the pixel simultaneously comprise pixels of the same color and pixels of a different color as the pixel of the target area.

14. The non-transitory storage medium of claim 13, wherein the effective pixels of the target area in the marked area are identified by:
determining the pixels other than the boundary pixels in the marked area to be pixels to be calibrated;
determining whether there is a boundary pixel in a horizontal direction and a vertical direction of the pixel to be calibrated; and
determining that the pixel to be calibrated is an effective pixel if each of the horizontal and the vertical directions of the pixel to be calibrated comprises at least one of the boundary pixels.

15. The non-transitory storage medium of claim 11, wherein the center and size of the target area are determined according to the position of the boundary pixels and the effective pixels by:
determining a shape of the target area according to the positions of the boundary pixels and the positions of the effective pixels in the marked area; and
calculating the size and the center of the target area according to the shape of the target area.

* * * * *